US012126109B2

(12) United States Patent
Lee et al.

(10) Patent No.: US 12,126,109 B2
(45) Date of Patent: Oct. 22, 2024

(54) MULTIPLE ROW ELECTRICAL CONNECTOR ASSEMBLY HAVING A TERMINAL-LESS CONNECTION SYSTEM

(71) Applicant: Lear Corporation, Southfield, MI (US)

(72) Inventors: Hyoun Lee, Rochester, MI (US); Samson Pasicaran, Cebu (PH); Jomary Ledesma, Lapu-Lapu (PH)

(73) Assignee: Lear Corporation, Southfield, MI (US)

( * ) Notice: Subject to any disclaimer, the term of this patent is extended or adjusted under 35 U.S.C. 154(b) by 388 days.

(21) Appl. No.: 17/565,023

(22) Filed: Dec. 29, 2021

(65) Prior Publication Data

US 2023/0208066 A1 Jun. 29, 2023

(51) Int. Cl.

*H01R 13/436* (2006.01)
*H01R 12/77* (2011.01)
*H01R 13/502* (2006.01)
*H01R 13/52* (2006.01)
*H01R 13/631* (2006.01)

(52) U.S. Cl.

CPC ......... *H01R 13/436* (2013.01); *H01R 12/771* (2013.01); *H01R 13/502* (2013.01); *H01R 13/5202* (2013.01); *H01R 13/631* (2013.01)

(58) Field of Classification Search

CPC .. H01R 13/436; H01R 12/771; H01R 13/502; H01R 13/5202; H01R 13/631; H01R 13/506; H01R 13/5208; H01R 12/772; H01R 13/627; H01R 13/629; H01R 13/639

See application file for complete search history.

(56) References Cited

U.S. PATENT DOCUMENTS 3,038,140 A 6/1962 Haberland
3,941,448 A * 3/1976 Evans .................... H01R 12/79 439/631
4,138,188 A 2/1979 Shannon
5,308,262 A 5/1994 Chishima
5,378,161 A 1/1995 Loder
5,807,130 A 9/1998 Miller et al.
6,064,003 A 5/2000 Moore et al.
6,755,680 B2 6/2004 Okamura et al.
7,063,560 B2 6/2006 Asao
7,232,334 B2 * 6/2007 Shimizu ............... H01R 12/771 439/496
7,354,308 B2 * 4/2008 Iwahori ................ H01R 12/778 439/587
8,840,412 B2 * 9/2014 Ohyama ............ H01R 13/5205 439/271
9,203,179 B2 * 12/2015 Ohyama ................ H01R 43/20
9,300,085 B2 3/2016 Morello et al.
9,508,465 B2 11/2016 Miura et al.

(Continued)

*Primary Examiner* — Abdullah A Riyami
*Assistant Examiner* — Nader J Alhawamdeh
(74) *Attorney, Agent, or Firm* — MacMillan, Sobanski & Todd, LLC

(57) ABSTRACT

An electrical connector assembly includes an electrically conductive structure having a flat flexible conductor with a plurality of end portions. Each of the plurality of end portions includes a plurality of electrically conductive traces. A plurality of wire contact wedges respectively support the plurality of end portions of the electrically conductive structure. A connector housing supports the plurality of wire contact wedges and the electrically conductive structure.

20 Claims, 11 Drawing Sheets

(56) References Cited

U.S. PATENT DOCUMENTS

| | | | | |
|---|---|---|---|---|
| 9,871,313 | B2 | 1/2018 | Saito et al. | |
| 10,637,171 | B1 * | 4/2020 | Campbell .............. | H01R 12/89 |
| 2008/0045066 | A1 | 2/2008 | Peter et al. | |
| 2023/0208066 | A1 * | 6/2023 | Lee ...................... | H01R 13/502<br>439/660 |

* cited by examiner

MULTIPLE ROW ELECTRICAL CONNECTOR ASSEMBLY HAVING A TERMINAL-LESS CONNECTION SYSTEM

BACKGROUND OF THE INVENTION

This invention relates in general to electrical connector assemblies that facilitate mechanical and electrical connections between two electrically conductive structures. In particular, this invention relates to an improved structure for such an electrical connector assembly that has multiple rows of electrical connectors and can quickly and easily be secured to plural electrically conductive structures, such as flat flexible conductors having multiple electrically conductive traces, without the need for separate electrical terminals within the electrical connector assembly.

Many electrical systems are known in the art that include one or more electrically operated devices. For example, most automobiles and other vehicles include a variety of electrically operated devices that can be selectively operated for the comfort and convenience of a driver or an occupant. Typically, each of these electrically operated devices is connected to a source of electrical energy (and/or other components of the electrical system) by one or more electrical conductors. In many instances, electrical connector assemblies are provided on the electrical conductors for facilitating the installation, service, and removal of these electrically operated devices to and from the electrical system.

A typical electrical connector assembly includes an outer housing (which is usually formed from an electrically non-conductive material) and an inner electrical terminal (which is usually formed from an electrically conductive material) that is supported within the housing. The housing usually has first and second openings extending therethrough, and the electrical terminal is supported within the housing adjacent to those first and second openings. The first opening facilitates the passage of a first electrically conductive structure through the housing into engagement with the electrical terminal supported therein. The second opening facilitates the passage of a second electrically conductive structure through the housing into engagement with the electrical terminal supported therein.

Although effective, it has been found that the manufacture of known electrical connector assemblies that include both an outer housing and an inner electrical terminal is relatively time-consuming and complicated. Thus, it would be desirable to provide an improved structure for such an electrical connector assembly that can quickly and easily be secured to an electrical connector assembly that has multiple rows of electrical connectors and can quickly and easily be secured to plural electrically conductive structures, such as flat flexible conductors having multiple electrically conductive traces, without the need for separate electrical terminals within the electrical connector assembly.

SUMMARY OF THE INVENTION

This invention relates to an electrical connector assembly that has multiple rows of electrical connectors and can quickly and easily be secured to plural electrically conductive structures, such as flat flexible conductors having multiple electrically conductive traces, without the need for separate electrical terminals within the electrical connector assembly. The electrical connector assembly includes an electrically conductive structure having a flat flexible conductor with a plurality of end portions. Each of the plurality of end portions includes a plurality of electrically conductive traces. A plurality of wire contact wedges respectively support the plurality of end portions of the electrically conductive structure. A connector housing supports the plurality of wire contact wedges and the electrically conductive structure.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
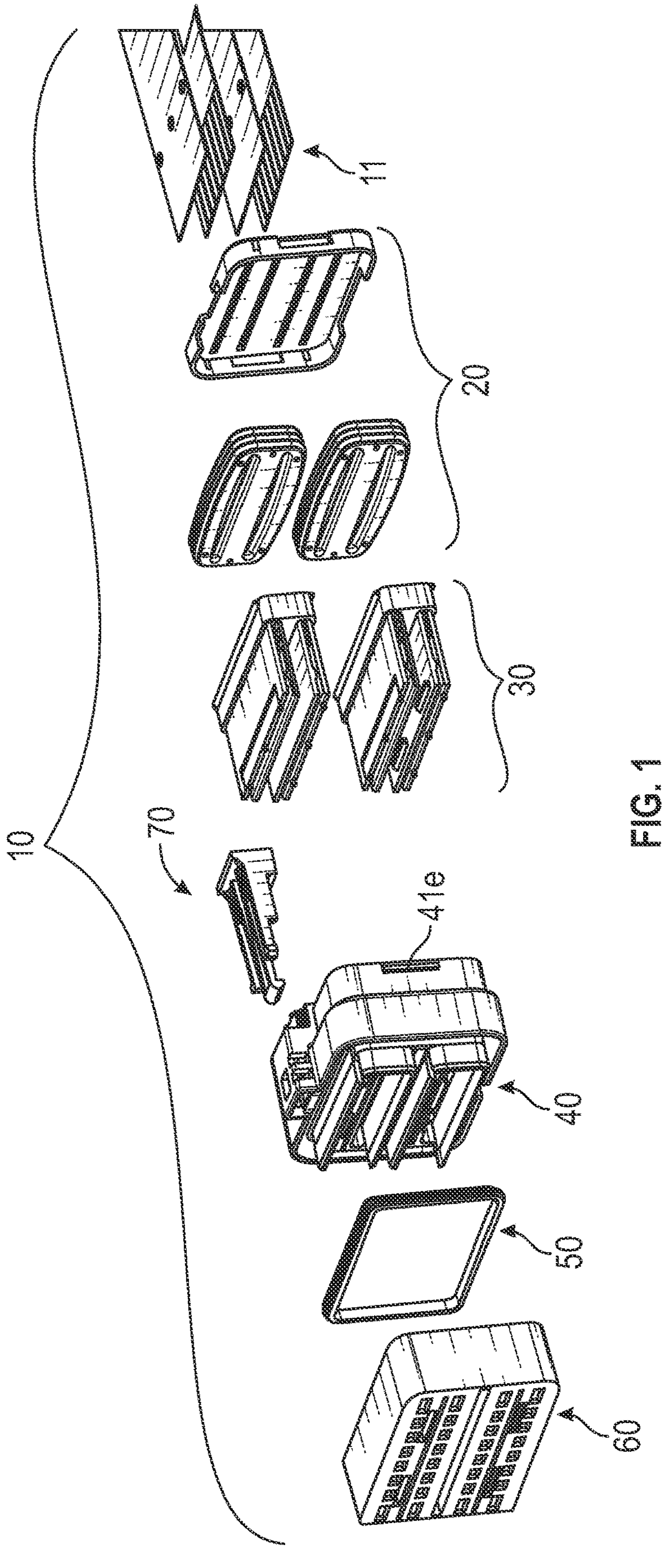
FIG. 1 is an exploded perspective view of an electrical connector assembly including an end of an electrically conductive structure, a first seal, a pair of wire contact wedges, a connector housing, a second seal, a cover, and a connector position assurance in accordance with this invention.

Referring now to the drawings, there is illustrated in FIG. 1 an electrical connector assembly, indicated generally at 10, in accordance with this invention. The electrical connector assembly 10 includes an electrically conductive structure, indicated generally at 11. In the illustrated embodiment, the electrically conductive structure 11 is a flat flexible conductor having a plurality of electrically conductive traces 12 that are surrounded by an outer electrically non-conductive insulator 13. As discussed above, most automobiles and other vehicles include a variety of electrically operated devices that can be selectively operated for the comfort and convenience of a driver or an occupant. Typically, each of these electrically operated devices is connected to a source of electrical energy (and/or other components of the electrical system) by one or more electrical conductors. The electrically conductive traces 12 of the electrically conductive structure 11 can be used for this purpose.

In the illustrated embodiment, an end of the electrically conductive structure 11 is divided into four separate end portions 11*a*, and each of those four end portions 11*a* has eight of the electrically conductive traces 12 provided thereon. Thus, the end of the illustrated electrically conductive structure 11 has a total of thirty-two of the electrically conductive traces 12. However, the electrically conductive structure 11 may include a greater or lesser number of such end portions 11*a* and electrically conductive traces 12 if desired. A portion of the electrically non-conductive insulator 13 is removed adjacent to the end of the electrically conductive structure 11 so as to expose the electrically conductive traces 12. Additionally, one or more openings 11*c* may extend through the illustrated electrically conductive structure 11. The purpose for the openings 11*c* will be discussed below and may the same as described in co-pending application Ser. No. 17/136,601, the disclosure of which is incorporated herein by reference. However, these openings 11*c* are optional and may, if desired, be omitted.

Figure 3:
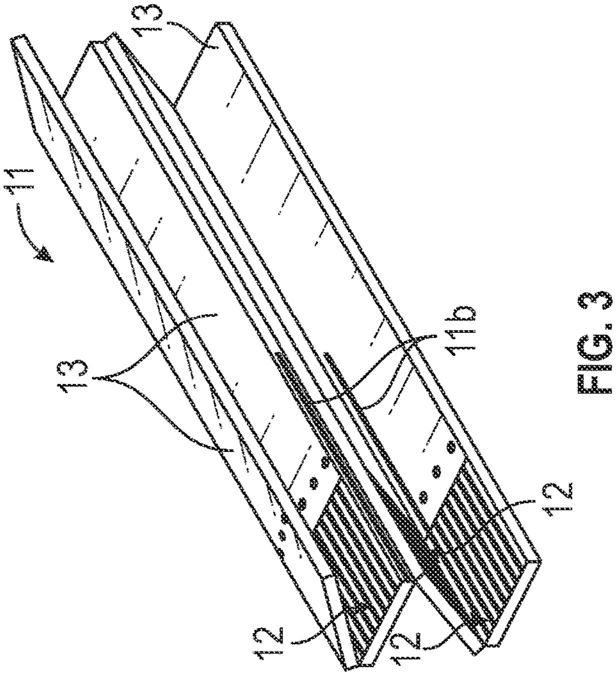
FIG. 3 is a perspective view of the end of the electrically conductive structure illustrated in FIGS. 1 and 2 shown in a partially folded condition.
Figure 2:
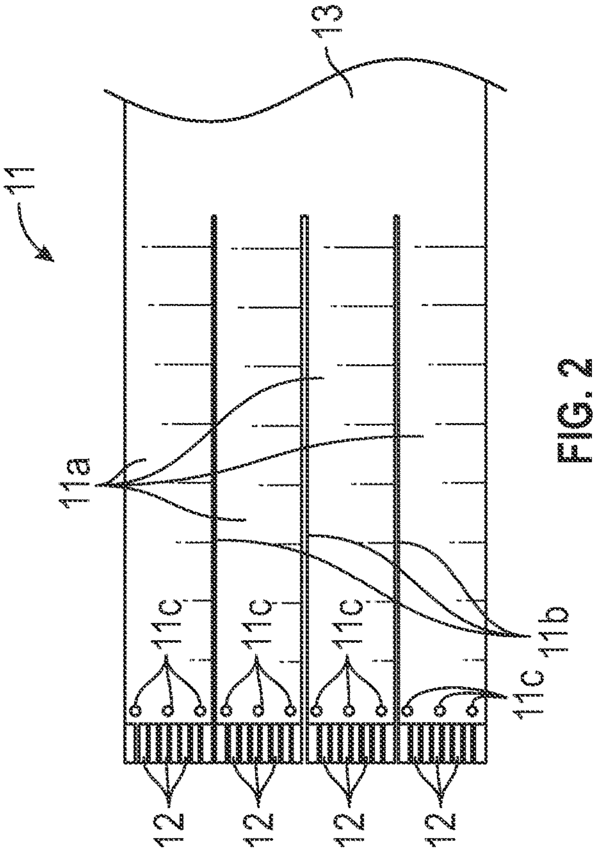
FIG. 2 is a top plan view of an end of the electrically conductive structure illustrated in FIG. 1 shown in an initially unfolded and cut condition.
Figure 4:
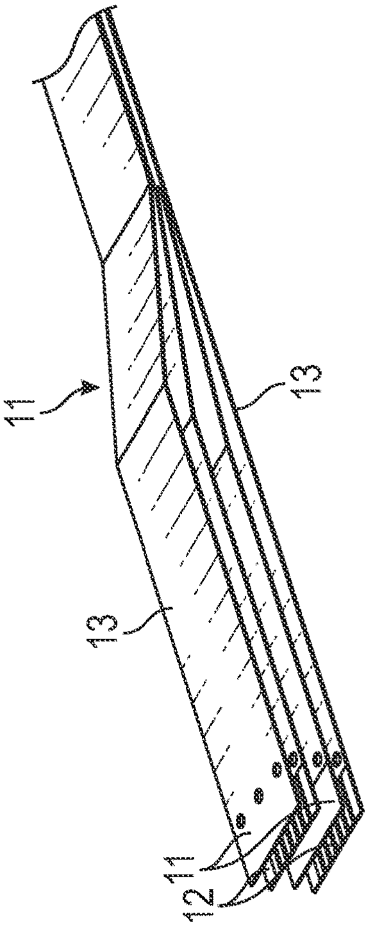
FIG. 4 is a perspective view of the end of the electrically conductive structure illustrated in FIGS. 1, 2, and 3 shown in a fully folded condition.

FIGS. 2, 3, and 4 illustrate one method that can be used to manufacture the end of the illustrated electrically conductive structure 11. Initially, the end portion of the electrically conductive structure 11 is provided with the thirty-two exposed electrically conductive traces 12 as discussed above. Then, as shown in FIG. 2, three cuts 11*b* can be made through the end portion of the electrically conductive structure 11 to define the four end portions 11*a*. The illustrated cuts 11*b* extend parallel to one another and axially inwardly from the end of the electrically conductive structure 11, although such is not required. Lastly, as shown in FIG. 3, the end of the electrically conductive structure 11 is axially folded in an accordion-like manner to orient the four end portions 11*a* in an overlapping and parallel arrangement shown in FIG. 4. In the illustrated embodiment, the exposed electrically conductive traces 12 provided on adjacent pairs of the four end portions 11*a* of the electrically conductive structure 11 face inwardly toward one another, although again such is not required.

Figure 6:
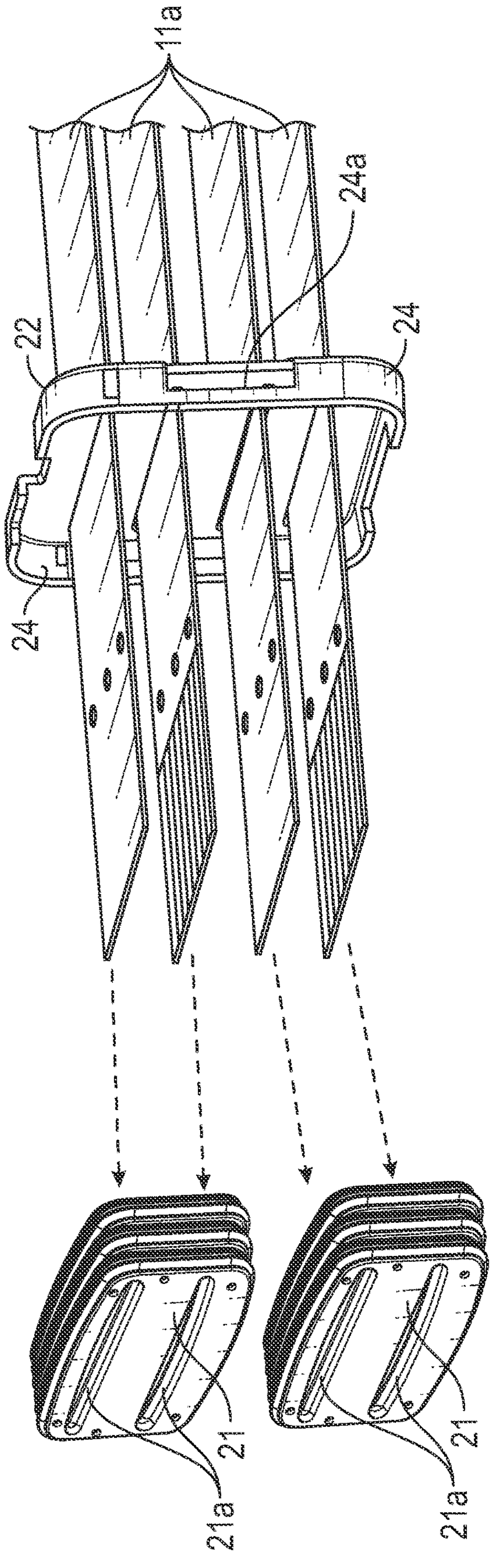
FIG. 6 is an exploded perspective view of the assembly of the electrically conductive structure and the first portion of the first seal illustrated in FIG. 5 shown prior to assembly with two second portions of the first seal illustrated in FIG. 1.

The electrical connector assembly 10 of this invention also includes a first seal, indicated generally at 20. The illustrated first seal 20 includes a pair of seal bodies 21, each having two openings 21*a* that extend axially therethrough. The illustrated seal bodies 21 of the first seal 20 are identical in structure, although such is not required. As best shown in FIG. 6, inner surfaces of each of the illustrated seal bodies 21 are defined by the openings 21*a*, and each of such inner surfaces has a width that is somewhat smaller and a height that is somewhat larger than the width and height of the end portions 11*a* of the electronically conductive structure 11, although such is not required. Also, each of such inner surfaces is illustrated as having an undulating shape, although again such as not required. Similarly, outer surfaces of each of the illustrated seal bodies 21 are also formed having undulating shapes. Each of the seal bodies 21 of the first seal 20 is preferably formed from a single piece of an elastomeric material, such as silicon, although any desired material or combination of materials may be used.

The first seal 20 also includes a retainer 22 having an end portion 23. In the illustrated embodiment, the end portion 23 of the retainer 22 has the same general shape as the overall combined shape defined by the two seal bodies 21, although such is not required. Four slots 23*a* (see FIGS. 19 and 20) extend through the end portion 23 of the retainer 22. In the illustrated embodiment, each slot 23*a* has approximately the same width and height as the width and height of an associated one of the end portions 11*a* of the electronically conductive structure 11, although such is not required. Lastly, two arm portions 24 extend generally axially from the end portion 23 of the retainer 22. Each of the illustrated arm portions 24 has an opening 24*a* extending therethrough. The purposes for the end portion 23, the slots 23*a*, and the arm portions 24 and openings 24*a* will be explained below. The retainer 22 of the first seal 20 is preferably formed from a single piece of a relatively rigid material, such as plastic, although any desired material or combination of materials may be used.

Figure 5:
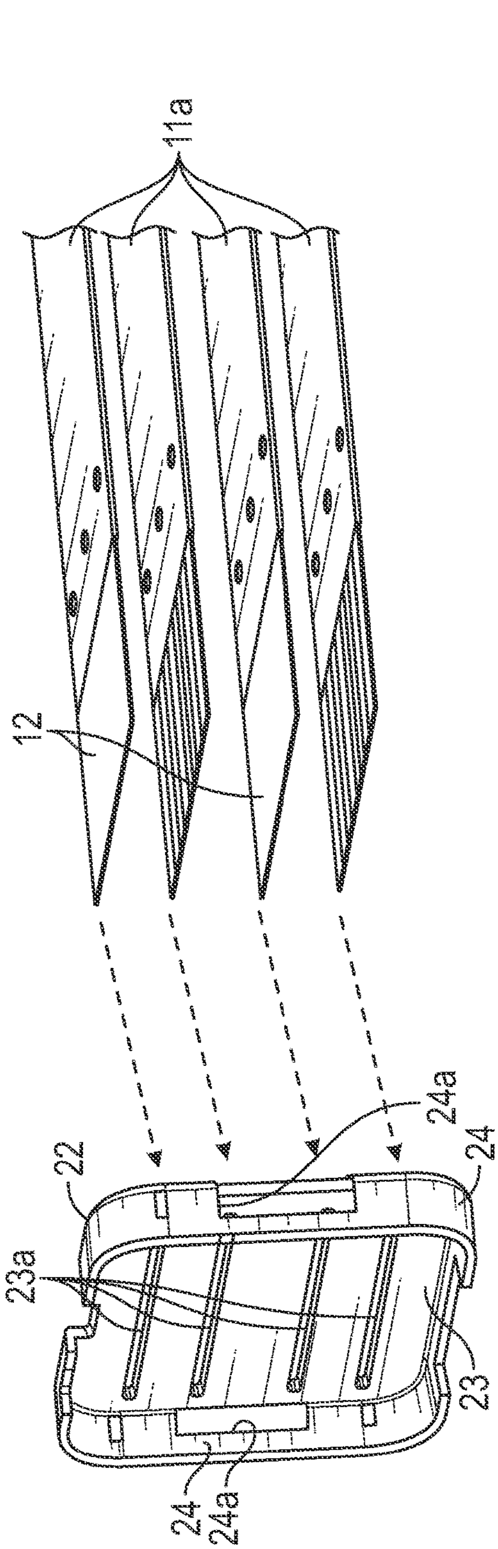
FIG. 5 is an exploded perspective view of the end of the fully folded electrically conductive structure illustrated in FIG. 4 shown prior to assembly with a first portion of the first seal illustrated in FIG. 1.
Figure 7:
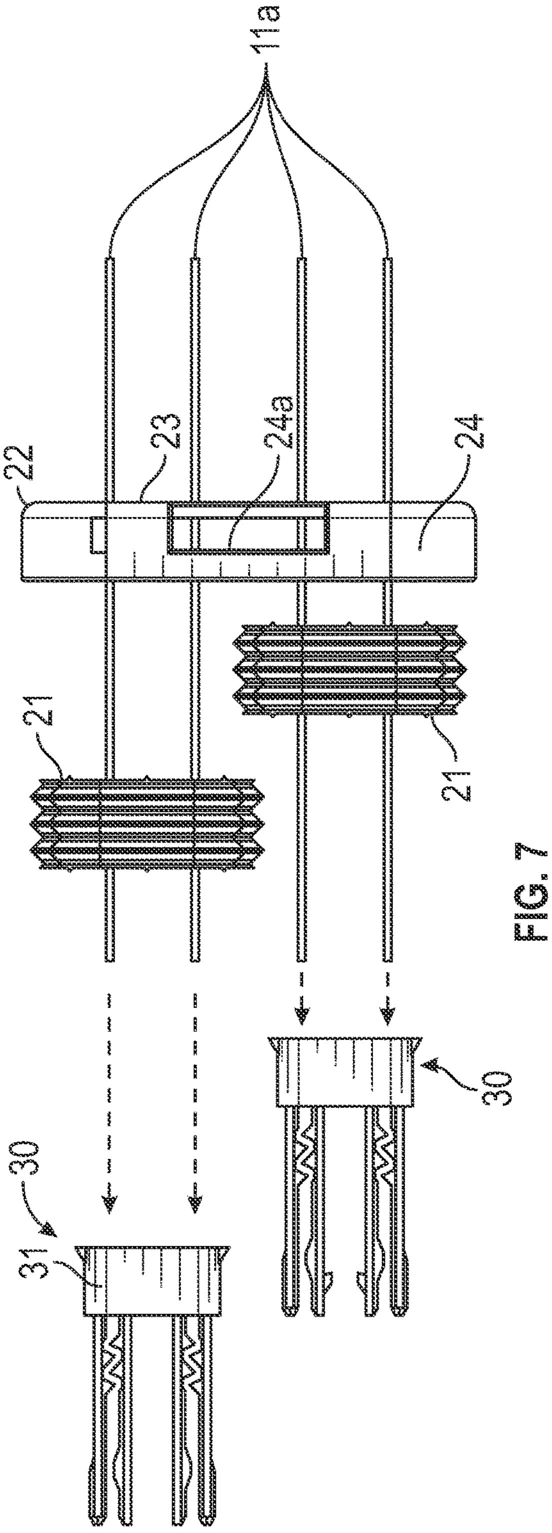
FIG. 7 is an exploded side elevational view of the assembly of the electrically conductive structure and the first seal illustrated in FIG. 6 shown prior to assembly with the pair of wire contact wedges illustrated in FIG. 1.

FIGS. 5, 6, and 7 illustrate how the first seal 20 can be assembled with the end portions 11*a* of the electrically conductive structure 11. Initially, the retainer 22 of the first seal 20 can be assembled onto the electrically conductive structure 11 by aligning each of the slots 23*a* extending through the end portion 23 with an associated one of the end portions 11*a* of the electrically conductive structure 11, as shown in FIG. 5. Then, the retainer 22 is moved axially toward the electrically conductive structure 11 such that the end portions 11*a* are received within and extend through their associated slots 23*a*, as shown in FIG. 6. Next, the seal bodies 21 of the first seal 20 can be assembled onto the electrically conductive structure 11 by initially aligning each of the openings 21*a* extending therethrough with an associated one of the end portions 11*a*, as also shown in FIG. 6. Lastly, the seal bodies 21 are moved axially toward the electrically conductive structure 11 such that the end portions 11*a* are received within and extend through their associated openings 21*a*, as shown in FIG. 7. If desired, small spaces may be maintained between the seal bodies 21 and the retainer 22 in order to facilitate the use of an assembly tool (not shown).

As mentioned above, each of the inner surfaces defined by the openings 21*a* through the seal bodies 21 has a width that is somewhat smaller and a height that is somewhat larger than the width and height of the end portions 11*a* of the electronically conductive structure 11. Consequently, when the end portions 11*a* of the electrically conductive structure 11 are inserted through their associated openings 21*a* as shown in FIG. 7, the widths of the openings 21*a* are increased and the heights of the openings 21*a* are decreased such that the seal bodies 21 are compressed onto the electrically conductive structure 11 to provide a secure seal therebetween.

The electrical connector assembly 10 of this invention further includes first and second wire contact wedges, indicated generally at 30. In the illustrated embodiment, the first and second wire contact wedges 30 are identical in shape, and each may have the same structure as described and illustrated in co-pending application Ser. No. 17/136,601, although such is not required.

Figure 19:
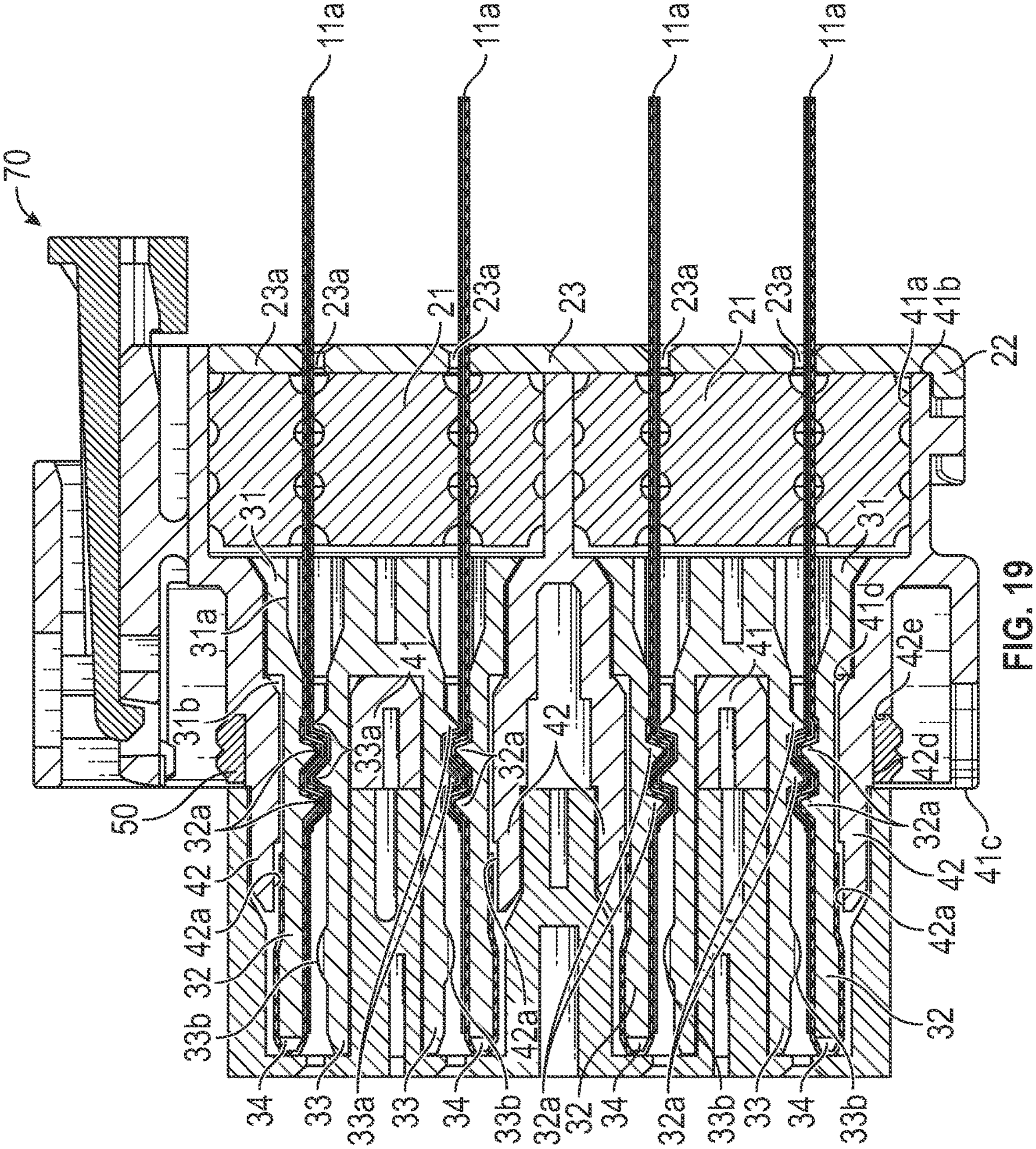
FIG. 19 is a sectional elevational view of the electrical connector assembly illustrated in FIG. 18.
Figure 20:
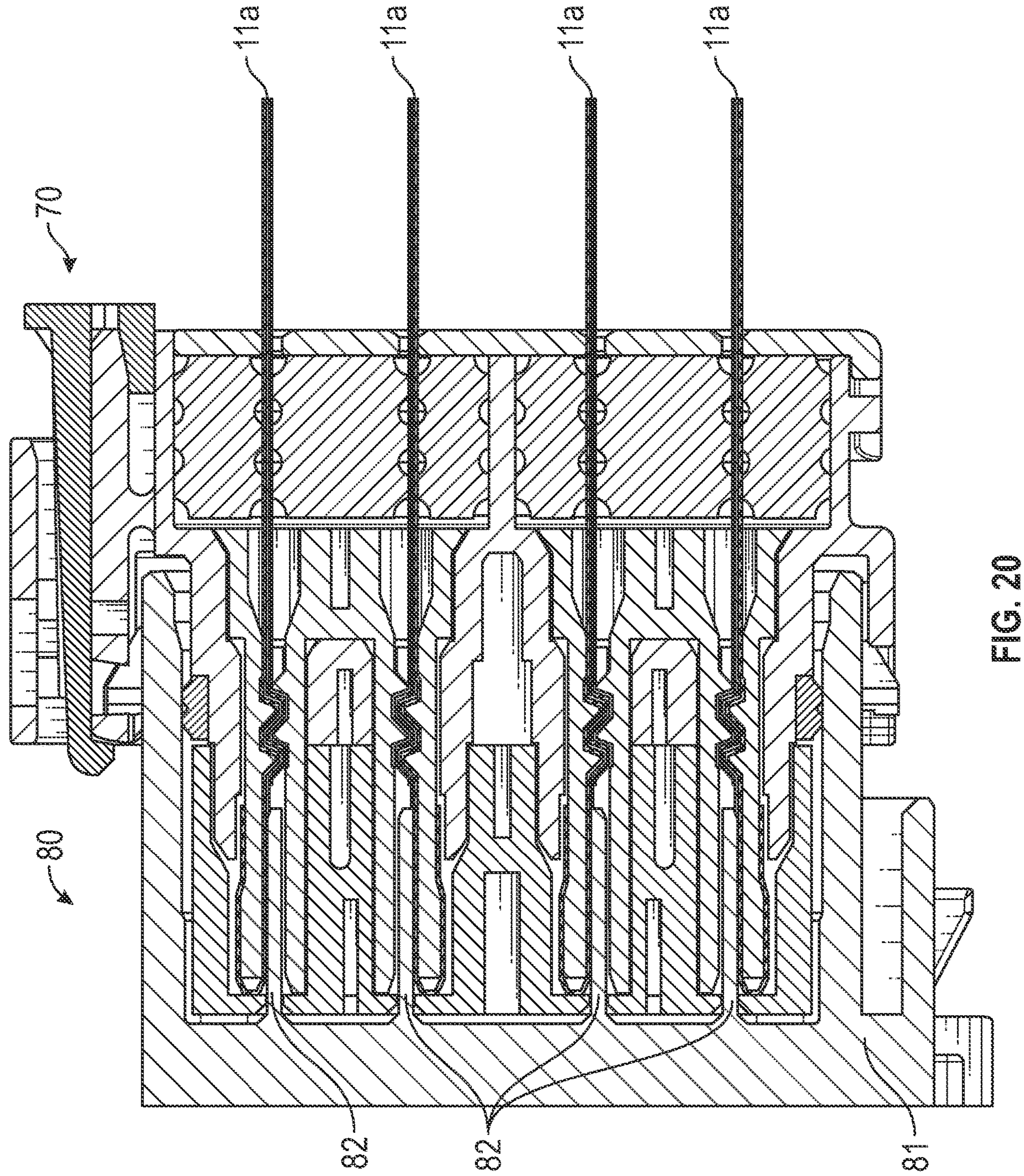
FIG. 20 is a sectional elevational view similar to FIG. 19 showing a mating component assembled onto the electrical connector assembly and the connector position assurance installed in a lock position on the electrical connector assembly.

As best shown in FIGS. 19 and 20, the first wire contact wedge 30 includes a base 31 having an opening 31*a* that extends from a first axial end of the wire contact wedge 30 to a second axial end thereof. The base 31 also has an axially-facing abutment surface 31*b* provided thereon for a purpose that will be explained below. First and second pairs of wedge arms 32 and 33 extend axially from the axially-facing abutment surface 31*b* provided at the second axial end of the base 31 on opposite sides of the opening 31*a*. The inwardly facing surfaces of each of the first wedge arms 32 has a pair of projections 32*a* provided thereon. Similarly, the inwardly facing surfaces of each of the second wedge arms 33 has a pair of protrusions 33*a* provided thereon. The illustrated projections 32*a* and protrusions 33*a* face toward one another and are axially offset from one another, although such is not required. Rather, any desired number of such projections 32*a* and protrusions 33*a* may be provided at any desired locations on the first and second wedge arms 32 and 33, respectively. Alternatively, the projections 32*a* and protrusions 33*a* may be omitted if desired.

As also best shown in FIGS. 19 and 20, each of the inwardly facing surfaces of each of the second wedge arms 33 also has a plurality of axially-extending embossments 33*b* (only one of which can be seen on each of the second wedge arms 33 in FIGS. 19 and 20) provided thereon. Such axially-extending embossments 33*b* are preferably located on the second wedge arms 33 so as to be respectively aligned with the traces 12 provided on the associated end portions 11*a* of the electrically conductive structure 11 as discussed below, although again such is not required. Finally, one or more positioning protrusions 34 (three in the illustrated embodiment shown in FIGS. 10 and 11) extend axially from an end of each of the first and second wedge arms 32 and 33. However, the protrusions 34 are optional and may, if desired, be omitted. The purposes of the embossments 32*b* and the positioning protrusions 34 will be explained below.

Figure 8:
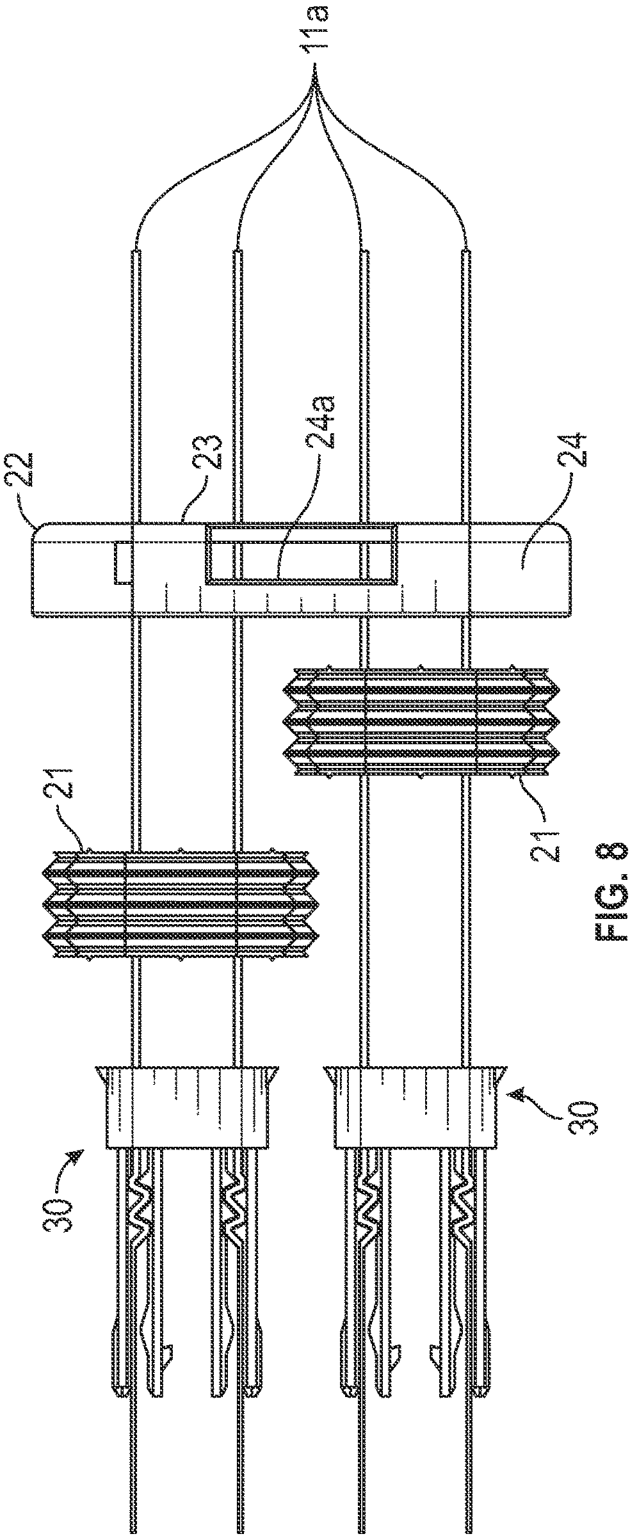
FIG. 8 is a side elevational view of the assembly of the electrically conductive structure, the first seal, and the pair of wire contact wedges illustrated in FIG. 7.
Figure 9:
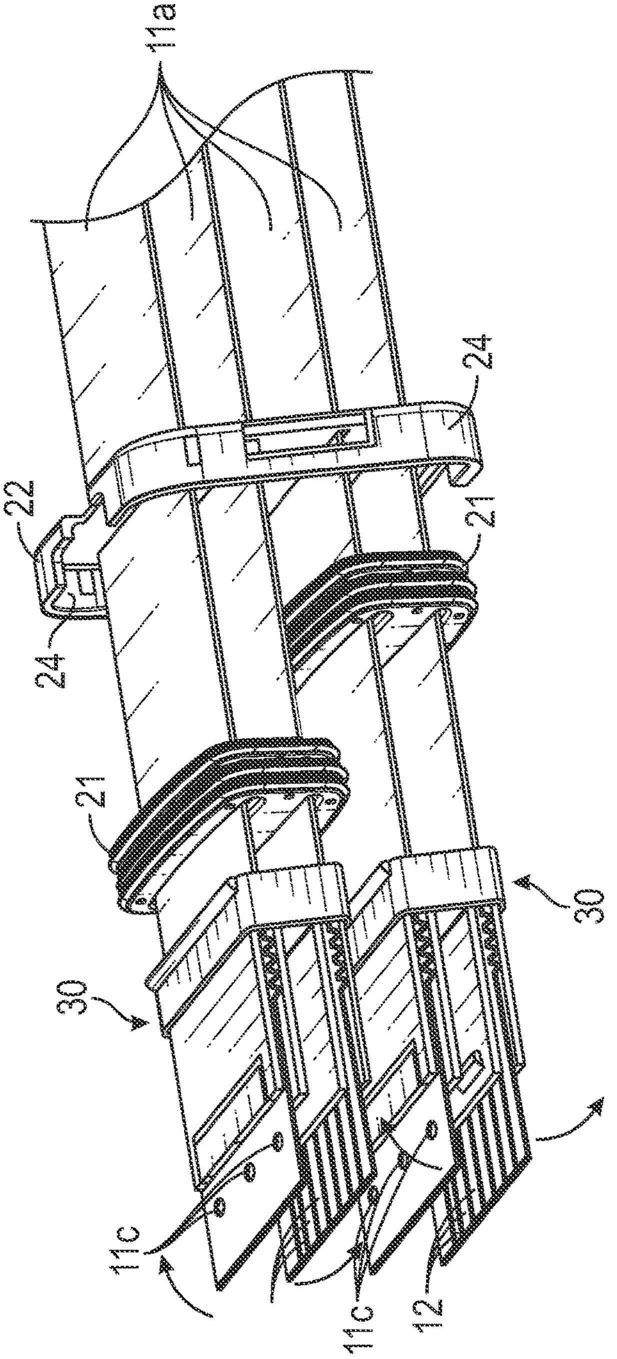
FIG. 9 is a perspective view of the assembly of the electrically conductive structure, the first seal, and the pair of wire contact wedges illustrated in FIG. 8.

FIGS. 7 through 10 illustrate how the electrically conductive structure 11 can be assembled with the first and second wire contact wedges 30. Initially, as shown in FIG. 7, leading ends of the end portions 11*a* of the electrically conductive structure 11 are axially aligned with the first axial ends of the bases 31 of the first and second wire contact wedges 30, adjacent to the openings 31*a* therethrough. Then, as shown in FIGS. 8 and 9, the leading ends of the end portions 11*a* of the electrically conductive structure 11 are inserted through the openings 31*a* and moved axially through the bases 31 of the first and second wire contact wedges 30. During such axial movement of the end portions 11*a* of the electrically conductive structure 11 through the first and second wire contact wedges 30, the first and second wedge arms 32 and 33 preferably move apart from one another to allow such end portions 11*a* to pass through the area between the projections 32*a* and 33*a*. Thus, it is desirable (but not necessarily required) that the first and second wedge arms 32 and 33 be sufficiently flexible to allow this movement to occur.

Figure 10:
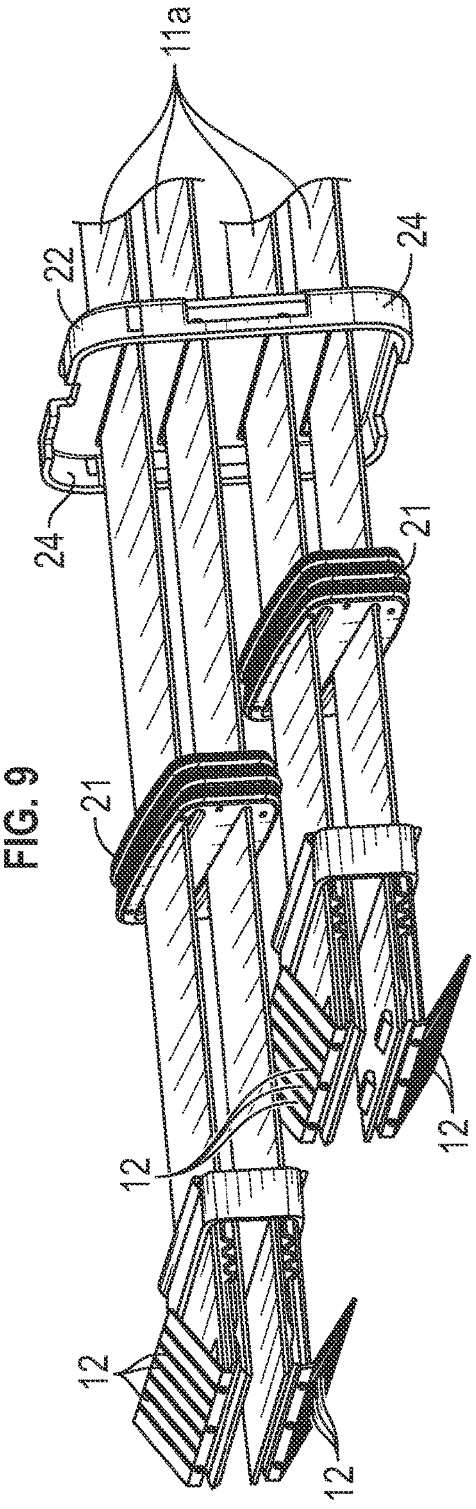
FIG. 10 is a perspective view similar to FIG. 9 showing end portions of the electrically conductive structure after being partially deformed about respective ends of the pair of wire contact wedges.

Such axial movement is continued until the openings extending through the end portions 11*a* of the electrically conductive structure 11 are disposed adjacent to the protrusions 34 provided on the axial ends of the second wedge arms 33 of the first and second wire contact wedges 30. Lastly, as shown in FIG. 10, the ends of the end portions 11*a* of the electrically conductive structure 11 are deformed such that the openings 11*c* extending therethrough are respectively disposed about the protrusions 34 provided on the axial ends of the second wedge arms 33 of the first and second wire contact wedges 30. As a result, the electrically conductive structure 11 is positively positioned relative to each of the first and second wire contact wedges 30 to prevent relative axial movement from occurring therebetween.

The electrical connector assembly 10 of this invention additionally includes a connector housing, indicated generally at 40. As will be explained below, the connector housing 40 is adapted to receive and support the first seal 20, the first and second wire contact wedges 30, and the electrically conductive structures 11 therein. As best shown in FIGS. 19 and 20, the illustrated connector housing 40 includes a body 41 having an opening 41*a* that extends axially from a first axial end 41*b* (the right end when viewing FIGS. 19 and 20) to a second axial end 41*c* (the left end when viewing FIGS. 19 and 20). In the illustrated embodiment, the portion of the opening 41*a* that is adjacent to the first axial end 41*b* of the body 41 is larger than the portion of the opening 41*a* that is adjacent to the second axial end 41*c* of the body 41, although such is not required. As a result, an axially-facing abutment surface 41*d* is defined within the opening 41*a* extending through the body 41. Two retainers 41*e* (one of which is illustrated in FIG. 1) are provided on opposed sides of the exterior of the connector housing 40, for a purpose that will be explained below.

The illustrated connector housing 40 also includes four supports 42 that each extend axially away from the second axial end 41*c* of the body 41 of the connector housing 40, adjacent to the opening 41*a*. In the illustrated embodiment, a recessed area 42*a* is provided on the outer end of each of the supports 42, although such is not required. The illustrated connector housing 40 further includes an outer sealing surface having both an axially extending portion 42*b* and a radially extending portion 42*c* (see FIG. 19). Lastly, the illustrated connector housing 40 includes a connector position assurance support 43. The purposes for the abutment surface 41*d*, the supports 42 and the recessed areas 42*a* provided thereon, the axially and radially extending portions 42*b* and 42*c* of the outer sealing surface, and the connector position assurance support 43 will also be explained below.

Figure 11:
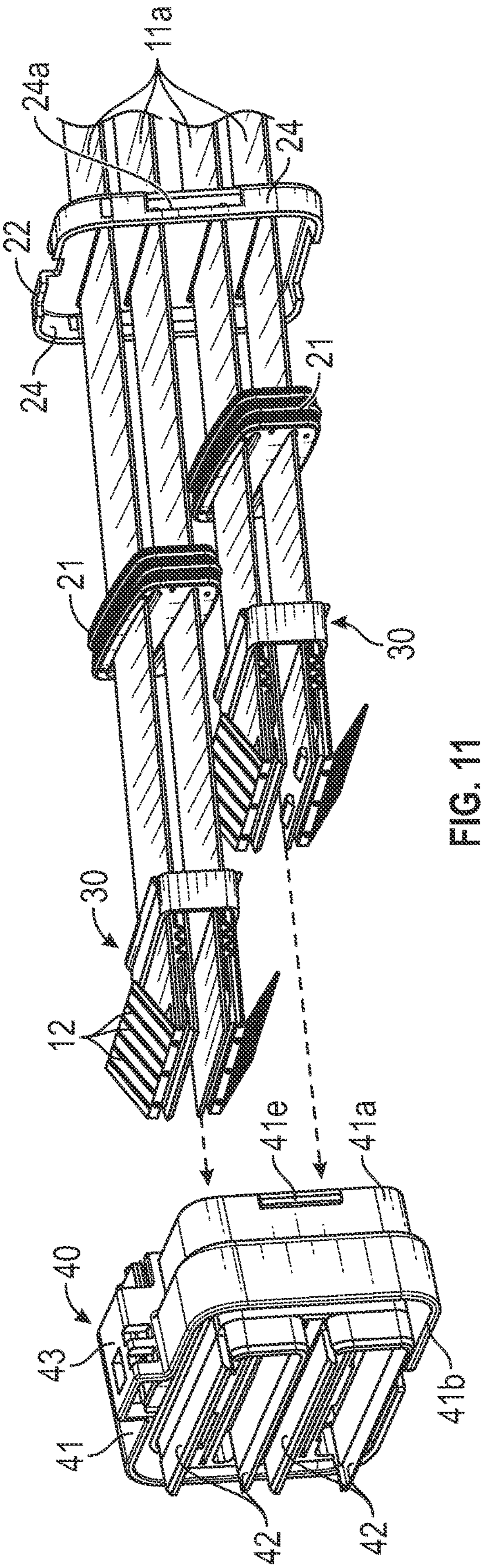
FIG. 11 is an exploded perspective view of the assembly of the electrically conductive structure, the first seal, and the pair of wire contact wedges illustrated in FIG. 10 shown prior to assembly with the connector housing illustrated in FIG. 1.
Figure 12:
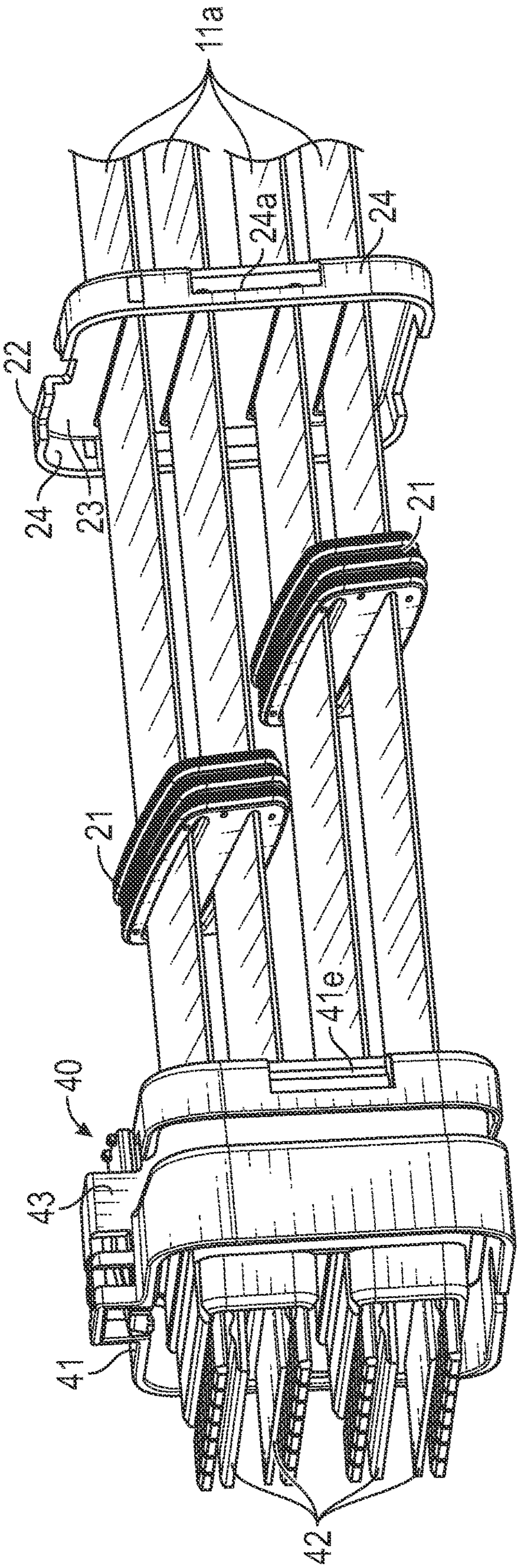
FIG. 12 is a perspective view of the electrically conductive structure, the first seal, the pair of wire contact wedges, and the connector housing illustrated in FIG. 11 shown partially assembled.
Figure 13:
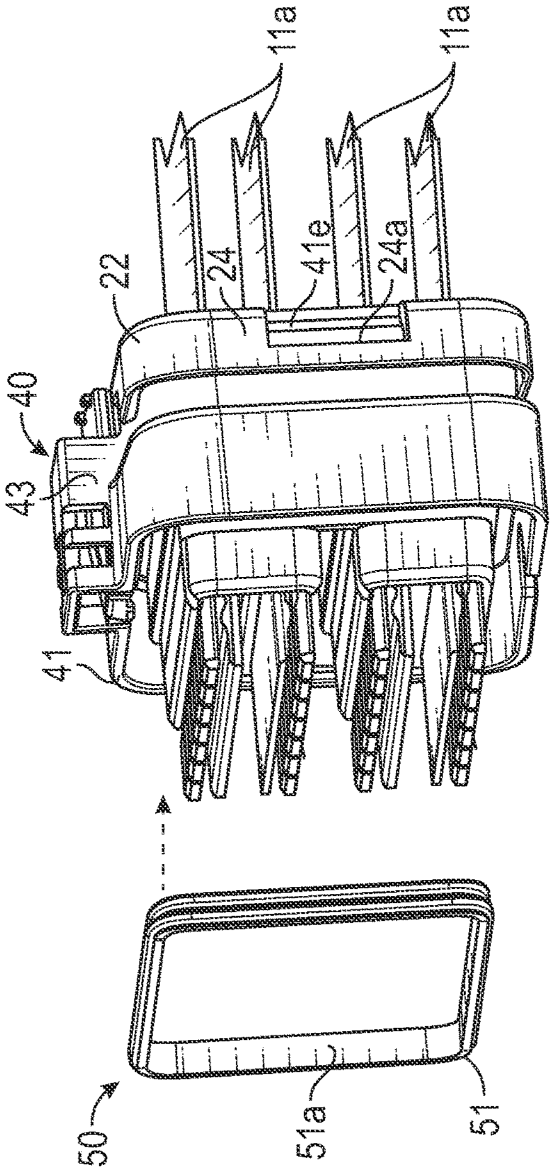
FIG. 13 is an exploded perspective view of the assembly of the electrically conductive structure, the first seal, the pair of wire contact wedges, and the connector housing illustrated in FIG. 12 shown prior to assembly with the second seal illustrated in FIG. 1.

FIGS. 11 through 13 illustrate how the connector housing 40 can be assembled with the electrically conductive structure 11, the first seal 20, and the first and second wire contact wedges 30. Initially, as shown in FIG. 11, leading ends of the end portions 11*a* of the electrically conductive structure 11 (already having the first seal 20 and the first and second wire contact wedges 30 supported thereon) are axially aligned with the respective openings 41*a* therethrough. Then, as shown in FIGS. 12 and 13, those leading end portions 11*a* are inserted through the openings 41*a* and moved axially through the body 41 of the connector housing 40. As a result, the first and second wire contact wedges 30, the first seal 20, and the electrically conductive structure 11 are all inserted through the opening 41*a* and moved axially through the body 41 of the connector housing 40 (from right to left when viewing FIGS. 12 and 19).

Such axial movement is continued until the abutment surfaces 31*b* provided on the bases 31 of the first and second wire contact wedges 30 engage the corresponding abutment surfaces 41*d* provided within the body 41 of the connector housing 40, as best shown in FIGS. 19 and 20. As a result, further axial movement of the assembly of the first and second wire contact wedges 30 is prevented. In this orientation, the wedge arms 32 and 33 of the first and second wire contact wedges 30 extend between and are supported by the supports 42 extending from the second axial end 41*c* of the body 41 of the connector housing 40. At the same time, end portions of the electrically conductive structure 11 are located adjacent to the recessed areas 42*b* provided on the inwardly facing surface of the supports 42 of the body 41. As a result, the electrically conductive structure 11 is positively positioned relative to the connector housing 40.

The electrical connector assembly 10 of this invention also includes a second seal 50 that is provided about the second axial and 41*c* of the connector housing 40 to positively prevent the entry of contaminants through the second end 41*c* into the interior thereof. As best shown in FIG. 13, the second seal 50 includes an annular body 51 having an opening 51*a* that extends axially therethrough. An inner surface of the body 51 (which is defined by the opening 51*a*) preferably has a size that is slightly smaller than a size defined by the axially extending sealing surface 42*b* on the body 41 of the connector housing 40. As best shown in FIGS. 19 and 20, an outer surface of the illustrated body 51 of the second seal 50 is formed having an undulating shape, although such as not required. The body 51 of the second seal 50 is preferably formed from an elastomeric material, such as silicon, although any desired material may be used.

Figure 14:
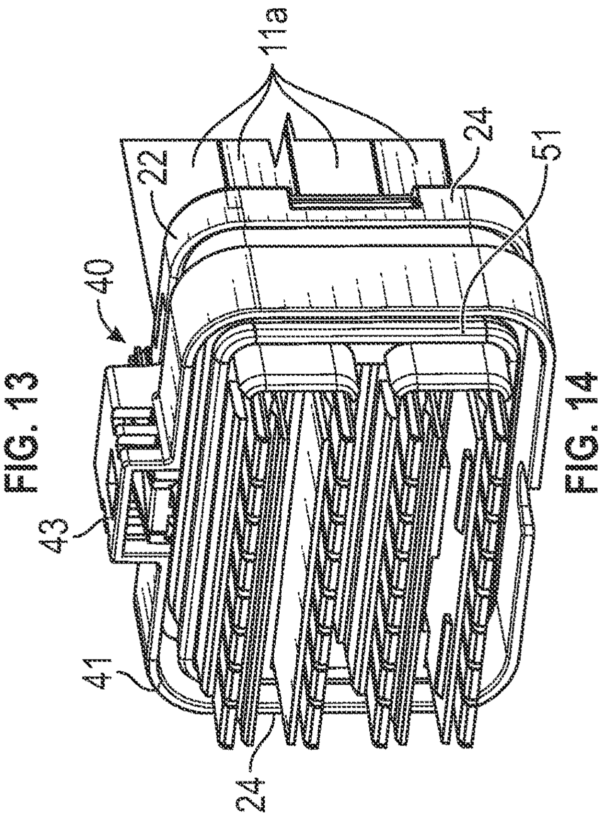
FIG. 14 is a perspective view showing the assembly of the electrically conductive structure, the first seal, the pair of wire contact wedges, the connector housing, and the second seal illustrated in FIG. 13.

FIGS. 13 and 14 illustrate how the second seal 50 can be assembled with the connector housing 40. Initially, as shown in FIG. 13, the second seal 50 can be axially aligned with the axially extending portion 42*b* of the sealing surface provided on the body 41 of the connector housing 40. Then, as shown in FIG. 14, the body 51 of the second seal 50 can be moved axially about the axially extending portion 42*b* of the sealing surface, as best shown in FIGS. 19 and 20. As mentioned above, the inner surface of the body 51 of the second seal 50 is preferably is slightly smaller in size than the inner surface of the axially extending sealing surface 42*b* upon which it is supported. As a result, the inner surface of the body 51 is compressed against the outer surface of the axially extending portion 42*b* of the sealing surface when installed thereon. The size of the opening 51*a* through the body 51 can be selected to attain a desired amount of compression of the second seal 50 against the axially extending portion 42*b* of the sealing surface. Such axial movement of the second seal 50 is continued until the leading end thereof abuts the radially extending portion 42*c* of the outer sealing surface, as also shown in FIG. 14.

The electrical connector assembly 10 of this invention further includes a cover, indicated generally at 60, that is adapted to be received within and supported on the assembly of the connector housing 40, the first and second wire contact wedges 30, the first and second seals 20 and 50, and the electrically conductive structure 11. The illustrated cover 60 includes a hollow body 61 that extends axially from an opened axial end 61*a* to a closed axial end 61*b*. One or more openings 62 extend through the closed axial end 61*b* of the hollow body 61 to the interior thereof. The number of such openings 62 may be the same as the number of traces 12 provided on the electrically conductive structure 11, although such is not required. Also, it is preferable that each of the openings 62 be axially aligned with a respective one of the traces 12, although again such is not required.

Figure 15:
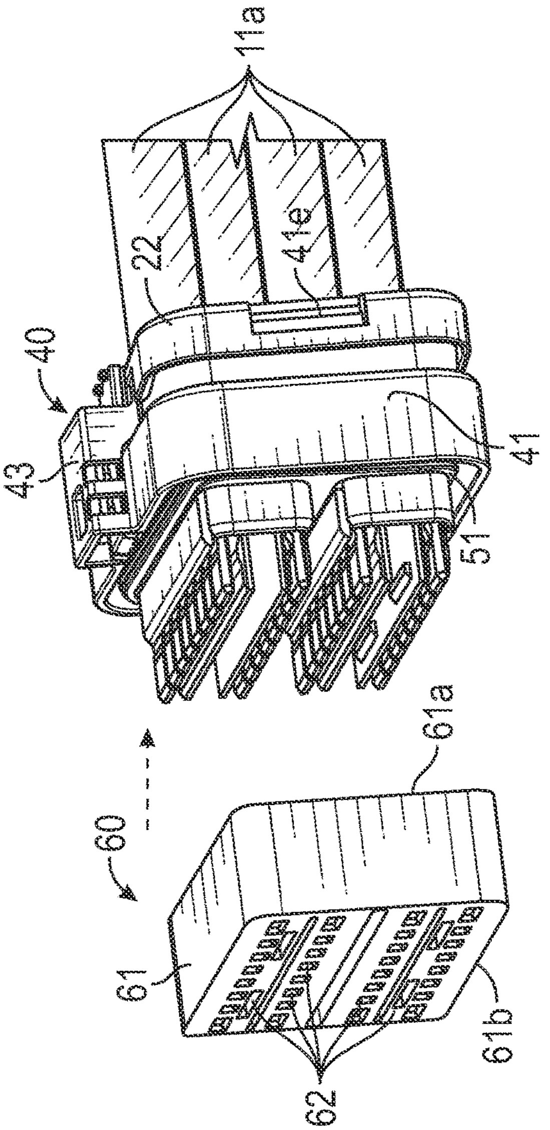
FIG. 15 is an exploded perspective view of the assembly of the electrically conductive structure, the first seal, the pair of wire contact wedges, the connector housing, and the second seal illustrated in FIG. 14 shown prior to assembly with the cover illustrated in FIG. 1.
Figure 16:
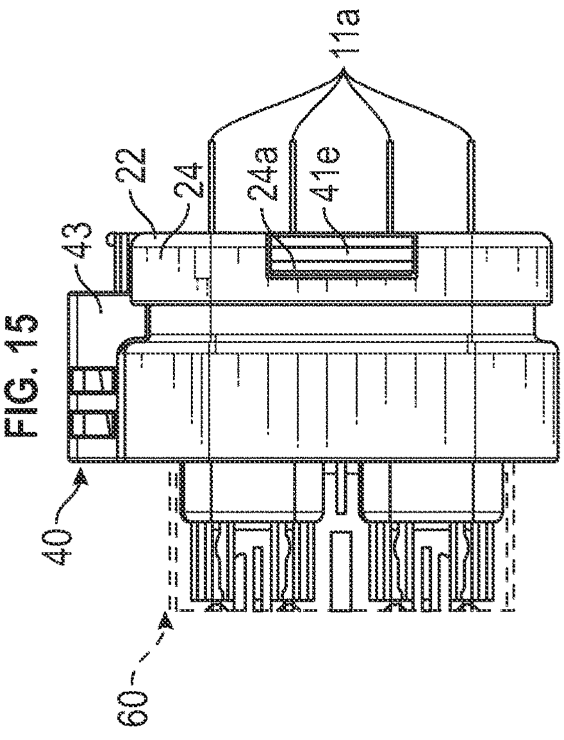
FIG. 16 is a side elevational view of the assembly of the electrically conductive structure, the first seal, the pair of wire contact wedges, the connector housing, the second seal, and the cover illustrated in FIG. 15.

FIGS. 15 and 16 illustrate how the cover 60 can be assembled with the assembly of the connector housing 40 and the other components of the electrical connector assembly 10. Initially, as shown in FIG. 15, the opened axial end of the cover 60 is axially aligned with second axial end 41*c* of the body 41 of the connector housing 40. Then, the body 61 of the cover 60 is moved axially toward the second axial end 41*c* of the housing 41 such that the supports 42 of the body 41 move axially through the opened axial end 61*a* and into the interior of the cover 60. Such axial movement continues until the opened axial end 61*a* of the cover 60 abuts an axially facing portion of the connector housing 40, such as the axially facing portion of the connector housing that is located adjacent to the axially extending portion 42*b* sealing surface of the connector housing 40 as shown in FIG. 16. When it is positioned in this orientation relative to the connector housing 40, the cover 60 provides a protective shield over the second axial and 41*c* of the connector housing 40. However, the cover 60 may be removed quickly and easily from the connector housing 40 by manually pulling the cover 60 axially in the opposite direction away from the second axial end 41*c* of the body 41 of the connector housing 40.

FIGS. 17 through 20 illustrate the installation of a connector position assurance, indicated generally at 70, onto the assembly of the electrically conductive structure 11, the first seal 20, the first and second wire contact wedges 30, the connector housing 40, the second seal 50, and the cover 60 illustrated in FIG. 16. The connector position assurance 70 is, of itself, conventional in the art and is movable between a pre-lock position (shown in FIGS. 18 and 19) and a lock position (shown in FIG. 20).

FIG. 20 also illustrates a second electrical connector assembly, indicated generally at 80, that may be connected to the electrical connector assembly 10 of this invention. The illustrated second electrical connector assembly 80 is conventional in the art and includes a body 81 having a plurality of male pin terminals 82 extending axially therefrom. When installed on the electrical connector assembly 10, the male pin terminals 82 of the second electrical connector assembly 80 respectively engage the embossments 33*b* provided on the second wedge arms 33 of the wire contact wedges 30. As a result, the second electrical connector assembly 80 is positively retained on the first electrical connector assembly 10. Additionally, the second electrical connector assembly

Figure 18:
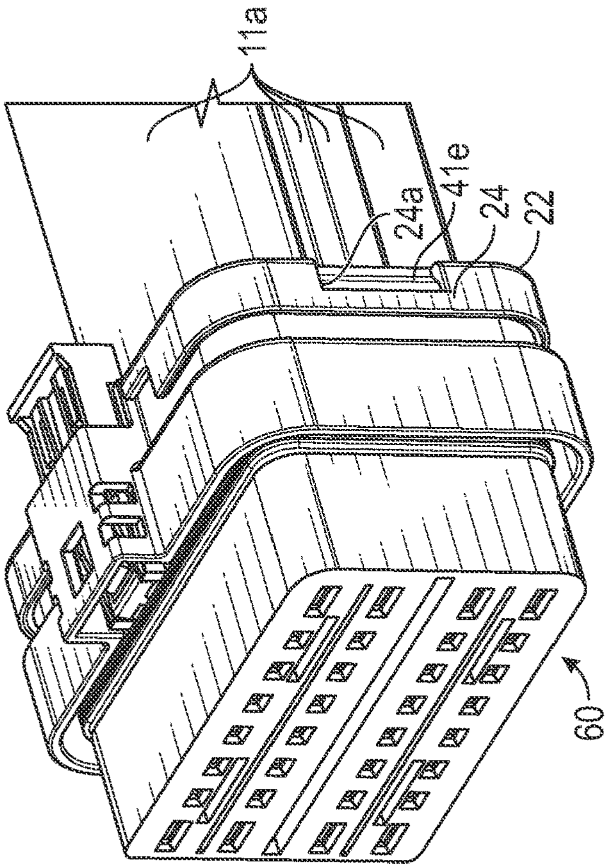
FIG. 18 is a perspective view similar to FIG. 17 showing the connector position assurance installed in a pre-lock position on the electrical connector assembly.
Figure 17:
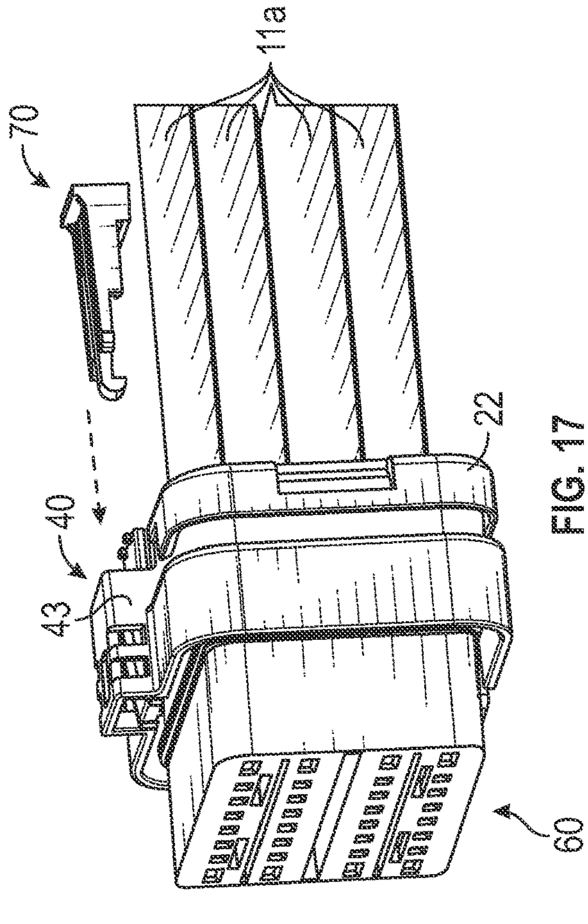
FIG. 17 is a perspective view of the assembly of the electrically conductive structure, the first seal, the pair of wire contact wedges, the connector housing, the second seal, and the cover illustrated in FIG. 16 shown prior to the installation of a connector position assurance.

80 may be positively prevented from being removed from the first electrical connector assembly 10 by moving the connector position assurance 70 from the pre-lock position shown in FIGS. 18 and 19 to the lock position shown in FIG. 20. The male pin terminals 82 of the second electrical connector assembly 80 are electrically connected to the traces 12 provided on the electrically conductive structure 11.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector assembly, comprising:

an electrically conductive structure including a plurality of end portions;

a plurality of wire contact wedges and each of the plurality of wire contact wedges comprises at least one pair of a first wedge arm and a second wedge arm adapted to support a single end portion, from amongst the plurality of end portions of the electrically conductive structure; and a connector housing supporting the plurality of wire contact wedges and the electrically conductive structure.

2. The electrical connector assembly defined in claim 1, wherein the electrically conductive structure is a flat flexible conductor further including a plurality of electrically conductive traces.

3. The electrical connector assembly defined in claim 1, wherein each of the plurality of end portions of the electrically conductive structure is a flat flexible conductor including a plurality of electrically conductive traces.

4. The electrical connector assembly defined in claim 1, wherein each of the plurality of wire contact wedges further comprises a base comprising an opening extending therethrough and the first wedge arm and the second wedge arm that extend from the base, and wherein each of the plurality of end portions of the electrically conductive structure extends respectively through the opening of the base and between the first wedge arm and the second wedge arm.

5. The electrical connector assembly defined in claim 4, wherein each of the first wedge arm and the second wedge arm has a projection that engages the electrically conductive structure.

6. The electrical connector assembly defined in claim 1, further including a seal comprising an end portion with a plurality of slots extending therethrough, and wherein the plurality of end portions of the electrically conductive structure extends respectively through the plurality of slots extending through the end portion.

7. The electrical connector assembly defined in claim 6, further including a plurality of seal bodies comprising respective openings extending therethrough, and wherein the plurality of end portions of the electrically conductive structure extends respectively through the plurality of openings extending through the plurality of seal bodies.

8. The electrical connector assembly defined in claim 6, wherein the end portion of the seal is supported on the connector housing.

9. An electrical connector assembly, comprising:

an electrically conductive structure including a flat flexible conductor comprising a plurality of end portions, each of the plurality of end portions including a plurality of electrically conductive traces;

a plurality of wire contact wedges and each of the plurality of wire contact wedges comprises at least one pair of a first wedge arm and a second wedge arm adapted to support a single end portion, from amongst the plurality of end portions of the electrically conductive structure; and a connector housing supporting the plurality of wire contact wedges and the electrically conductive structure.

10. The electrical connector assembly defined in claim 9, wherein each of the plurality of wire contact wedges further comprises a base comprising an opening extending therethrough and the first wedge arm and the second wedge arm that extend from the base, and wherein each of the plurality of end portions of the electrically conductive structure extends respectively through the opening of the base and between the first wedge arm and second wedge arm.

11. The electrical connector assembly defined in claim 10, wherein each of the first wedge arm and second wedge arm has a projection that engages the electrically conductive structure.

12. The electrical connector assembly defined in claim 9, further including a seal comprising an end portion with a plurality of slots extending therethrough, and wherein the plurality of end portions of the electrically conductive structure extends respectively through the plurality of slots extending through the end portion.

13. The electrical connector assembly defined in claim 12, further including a plurality of seal bodies comprising respective openings extending therethrough, and wherein the plurality of end portions of the electrically conductive structure extends respectively through the plurality of openings extending through the plurality of seal bodies.

14. The electrical connector assembly defined in claim 12, wherein the end portion of the seal is supported on the connector housing.

15. The electrical connector assembly of claim 1, wherein the electrically conductive structure further comprises a plurality of openings, wherein an axial end of the second wedge arm comprises a protrusion, and wherein the associated one end portion is deformed around the protrusion such that an opening of the plurality of openings associated with the associated one end portion is disposed about the protrusion provided on the axial end.

16. The electrical assembly of claim 1, wherein an inward facing side of the first wedge arm comprises a pair of projections and an inward facing side of the second wedge arm comprises a pair of protrusions such that the pair of projections and the pair of protrusions faces toward one another and are axially offset from one another.

17. The electrical assembly of claim 2, wherein the second wedge arm comprises a plurality of embossments adapted to align with the plurality of electrically conductive traces.

18. The electrical assembly of claim 1, further comprising a cover adapted to support the connector housing.

19. The electrical connector assembly of claim 9, wherein the electrically conductive structure further comprises a plurality of openings, wherein an axial end of the second wedge arm comprises a protrusion, and wherein the associated one end portion is deformed around the protrusion such that an opening of the plurality of openings associated with the associated one end portion is disposed about the protrusion provided on the axial end.

20. The electrical assembly of claim 9, wherein an inward facing side of the first wedge arm comprises a pair of projections and an inward facing side of the second wedge arm comprises a pair of protrusions such the pair of projections and the pair of protrusions faces toward one another and are axially offset from one another.

* * * * *